June 6, 1933.  A. LENNING  1,912,644
REFRIGERATION
Filed Feb. 18, 1929
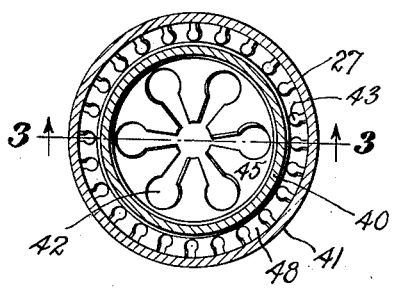
Fig. 2.
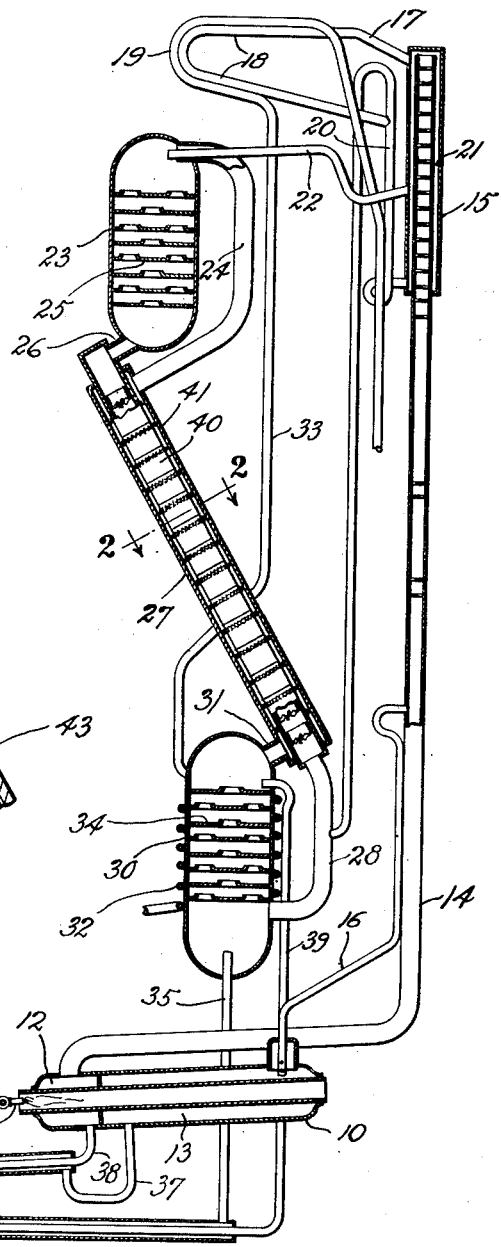
Fig. 3.
Fig. 1.
INVENTOR
Alvar Lenning
BY
Wm T. Hedlund
his ATTORNEY Patented June 6, 1933

1,912,644

UNITED STATES PATENT OFFICE

ALVAR LENNING, OF NEW YORK, N. Y., ASSIGNOR TO ELECTROLUX SERVEL CORPORATION, OF NEW YORK, N. Y., A CORPORATION OF DELAWARE

REFRIGERATION

Application filed February 18, 1929. Serial No. 340,803.

My invention relates to heat exchangers and particularly to heat exchangers used in refrigerating apparatus for the transfer of heat between fluids, more specifically gaseous fluids.

In refrigerating apparati in which gaseous fluids is circulated between and through the evaporator and the absorber by means of differences of specific weights of different vertically extending bodies, the force for obtaining circulation is of rather small magnitude. With slow moving gases and with relatively small forces for producing circulation, heat exchange presents difficulties in some arrangements.

The object of my invention is to provide an improved efficiency of heat exchange over that obtained by tubular heat exchangers in devices of the above outlined type and kindred devices.

Heat exchangers have been provided with baffling members to stir or mix gases but baffling devices usually cause a variation in the cross-sectional area of flow. It is a purpose of this invention to provide a heat exchanger for gases wherein the gases are diverted in flow without altering the cross-sectional area of flow.

The invention will be apparent from the following description taken in connection with the accompanying drawing showing the preferred form of the invention.

Referring to the accompanying drawing:

Fig. 1 shows a refrigerating system of the absorption type embodying the invention;

Fig. 2 is a cross-sectional view taken on the line 2—2 of Fig. 1; and

Fig. 3 is a longitudinal sectional view taken on the line 3—3 of Fig. 2.

The refrigerating system illustrated comprises a generator 10 containing a solution of ammonia in water. Heat is applied to the generator by gas burner 11 causing formation of vapor in both chambers 12 and 13 of the generator. A main conduit 14 extends upwardly from chamber 12 of the generator and enters a rectifier 15. A percolator conduit 16 extends upwardly from generator chamber 13 and discharges into conduit 14. Ammonia vapor with some entrained vapor passes upwardly through conduit 14 and into rectifier 15 where the entrained water vapor is separated out, liquefied, and caused to return toward the generator.

Ammonia vapor passes through conduit 17 and into condenser 18 which is cooled by running water in pipe 19. The liquefied ammonia passes into conduit 20 and jacket 21 of the rectifier and then through conduit 22 and into evaporator 23.

In the evaporator liquefied ammonia meets hydrogen entering the evaporator through conduit 24. The ammonia evaporates into the hydrogen and in so doing takes up heat. The evaporator is equipped with a series of disks 25 forming pools of liquid ammonia for giving a large surface for gas and liquid contact.

The mixture of ammonia vapor and hydrogen formed in the evaporator leaves the bottom of the evaporator through conduit 26 and enters the gas heat exchanger designated generally by the reference character 27. Connected to the lower end of the gas heat exchanger is a conduit 28 which conducts the gaseous fluid to the lower part of absorber 30. In the absorber absorption liquid, water, entering through conduit 39, absorbs ammonia, liberating the hydrogen. The liberated hydrogen passes through conduit 31 and into heat exchanger 27 and thence through conduit 24 into the upper part of the evaporator.

The absorber is cooled by coil 32 which is connected by conduit 33 with conduit 19. The absorber also contains disks 34 for providing a large surface for gas and liquid contact.

Strong liquor leaves the bottom of the absorber through conduit 35, passes through liquid heat exchanger 36 and enters chamber 13 of the generator through conduit 37. Pipe 16 acts as a percolator and lifts the absorption liquid to so high a level in conduit 14 that weak liquid flows through conduit 38, through heat exchanger 36 and through conduit 39 into the upper part of the absorber.

Conduit 20 is connected to conduit 28 in order to conduct entrained gas from the condenser to the absorber.

Referring more particularly to the gas heat exchanger 27, this structure comprises concentric tubes, an inner tube 40 and an outer tube 41. The inner tube bounds a central space 42 and the two tubes bound an annular space 43. The upper part of the central space 42 is connected to conduit 26. The lower part of space 42 is connected to conduit 28. The upper part of annular space 43 is connected to conduit 24 and the lower part of annular space 43 is connected to conduit 31.

Inside the central space 42 is a series of transverse baffling devices 45, each comprising a cylindrical portion 46 adjacent and in close contact with the inner tube 40 and each comprising blades 47 extending inwardly and arranged at an angle to the general line of flow of fluid. The transverse baffling devices may be made from a flat plate by first drawing the flat plate into cup shape, then drilling holes in the bottom of the cup near the edges and in the center and then simultaneously cutting and stamping the bottom of the cup to form the blades and bending the blades out of alignment. The blades are in the nature of fan blades and cause a stirring of the gas. This stirring is accomplished without materially reducing the cross-sectional area of flow. The purpose of the arrangement is to provide a stirring of the gas without causing spaces of expansion and contraction. This permits a small circulating force.

The annular space 43 is provided with a series of transverse baffling devices 48 made in similar manner to the baffling devices 45. These are also made by drilling, cutting and stamping. Baffling devices 48 each comprise a cylindrical portion 49 adjacent to and in close contact with tube 40 and downwardly extending blades 50, like fan blades, arranged at an angle to the general flow of fluid and serving to stir the gases without materially reducing the cross-sectional area of flow.

In the system of the type shown in Fig. 1, heat exchange is desirable between the gas passing from the evaporator to the absorber on the one hand and the gas passing from the absorber to the evaporator on the other hand. By utilizing the cold gas leaving the evaporator to cool the gas entering the evaporator, a saving of refrigeration and consequently an increased efficiency is obtained.

Circulation of gas is produced between the evaporator 23 and the absorber 30 as follows: The mixture of gaseous ammonia and hydrogen formed in the evaporator is heavy. This gas mixture flows downwardly through conduit 26, through the inner tube 40 of the heat exchanger, through conduit 28 and into the absorber. Liberated hydrogen in the absorber is light and passes up through conduit 21, annular space 43 and conduit 24. Continuous circulation is produced due to the fact that the gas mixture in the evaporator, conduit 26, central space 42 and conduit 28 is heavier than the liberated hydrogen in the absorber, in conduit 31, annular space 43 and conduit 24. It will thus be seen that the force for circulation is dependent upon the difference of specific weights of different vertically extending bodies of gas. The present type of heat exchanger permits an efficient heat transfer with a small circulating force of this nature.

While I have shown and described one manner of carrying out my invention, it will be understood that various arrangements may be used within the spirit and scope of the invention and that I am not limited to the particular modifications shown and described.

Having thus described my invention, what I claim is:

1. In an absorption refrigerating apparatus of the type wherein an inert gas is circulated between the evaporator and the absorber, a gas heat exchanger for the inert gas circuit comprising a pair of concentric tubular members and means in the annular space between said members for providing increased heat transfer surface, said means comprising a cylindrical portion and inclined blades secured to and extending radially from said cylindrical portion, said means formed so as to provide unobstructed passageways between said blades.

2. In an absorption refrigerating apparatus of the type wherein an inert gas is circulated between the evaporator and the absorber, a gas heat exchanger for the inert gas circuit comprising a pair of concentric tubular members and means in the annular space between said members for providing increased heat transfer surface, said means comprising a cylindrical portion around the inner tubular member and inclined blades secured to and extending radially outwardly from said cylindrical portion, said means formed so as to provide unobstructed passageways between said blades.

3. In an absorption refrigerating apparatus of the type wherein an inert gas is circulated between the evaporator and the absorber, a gas heat exchanger for the inert gas circuit comprising a pair of concentric tubular members, and means within the inner of said members and in the annular space between said members for providing increased heat transfer surface, said means comprising a plurality of members having a cylindrical portion and inclined blades extending radially from said cylindrical portion, said last-mentioned members formed so as to provide unobstructed passageways between said blades.

4. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of cups, said cups having end portions extending transversely to the flow of fluid comprising twisted blades constituting said projections and disposed obliquely to the path of flow and formed to provide unobstructed flow between them.

5. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of elements, each element having a cylindrical portion and blades constituting said projections extending radially with respect thereto and formed to provide unobstructed flow between the blades.

6. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of elements, each element having a cylindrical portion and blades constituting said projections extending radially inward with respect thereto and formed to provide unobstructed flow between the blades.

7. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of elements, each element having a cylindrical portion and blades constituting said projections extending radially outward with respect thereto and formed to provide unobstructed flow between the blades.

8. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of elements, each element having a cylindrical portion and blades constituting said projections extending radially with respect thereto and obliquely to the flow of fluid and formed to provide unobstructed flow between the blades.

9. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of elements, each element having a cylindrical portion and blades constituting said projections extending radially inward with respect thereto and obliquely to the flow of fluid and formed to provide unobstructed flow between the blades.

10. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of elements, each element having a cylindrical portion and blades constituting said projections extending radially outwardly with respect thereto and obliquely to the flow of fluid and formed to provide unobstructed flow between the blades.

11. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of elements, each element having a cylindrical portion having an end lying in a plane transverse to the flow of fluid and having blades constituting said projections and extending radially from adjacent to said end, each of said blades being oblique to the flow of fluid and lying on both sides of said plane, said blades being formed to provide unobstructed flow therebetween.

12. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of elements, each element having a cylindrical portion having an end lying in a plane transverse to the flow of fluid and having blades constituting said projections and extending radially inward from adjacent to said end, each of said blades being oblique to the flow of fluid and lying on both sides of said plane, said blades being formed to provide unobstructed flow therebetween.

13. In an absorption refrigerating apparatus of the type wherein an inert gas is circulated between the evaporator and the absorber, a gas heat exchanger for the inert gas circuit having an outer casing and interior members forming concentric paths of flow for gases and providing projections into the paths of flow for heat conduction, said interior members comprising a plurality of elements, each element having a cylindrical portion having an end lying in a plane transverse to the flow of fluid and having blades constituting said projections and extending radially outwardly from adjacent to said end, each of said blades being oblique to the flow of fluid and lying on both sides of said plane, said blades being formed to provide unobstructed flow therebetween.

In testimony whereof I have affixed my signature.

ALVAR LENNING.